United States Patent
Maier

(10) Patent No.: US 9,878,952 B2
(45) Date of Patent: Jan. 30, 2018

(54) MORTAR COMPOSITION FOR AN INTERIOR COATING OR LINING

(71) Applicant: SAINT-GOBAIN WEBER, Servon (FR)

(72) Inventor: Wolfram Maier, Gundelfingen (DE)

(73) Assignee: SAINT-GOBAIN WEBER, Servon (FR)

( * ) Notice: Subject to any disclaimer, the term of this patent is extended or adjusted under 35 U.S.C. 154(b) by 0 days.

(21) Appl. No.: 15/325,608

(22) PCT Filed: Jul. 7, 2015

(86) PCT No.: PCT/FR2015/051878
§ 371 (c)(1),
(2) Date: Jan. 11, 2017

(87) PCT Pub. No.: WO2016/012686
PCT Pub. Date: Jan. 28, 2016

(65) Prior Publication Data
US 2017/0158562 A1 Jun. 8, 2017

(30) Foreign Application Priority Data

Jul. 24, 2014 (FR) .................................. 14 57165

(51) Int. Cl.
*C04B 28/34* (2006.01)
*C04B 26/02* (2006.01)
(Continued)

(52) U.S. Cl.
CPC .............. *C04B 28/34* (2013.01); *C04B 14/00* (2013.01); *C04B 16/00* (2013.01); *C04B 26/02* (2013.01);
(Continued)

(58) Field of Classification Search
CPC ......... C04B 14/00; C04B 16/00; C04B 26/02; C04B 26/10; C04B 28/02; C04B 28/04;
(Continued)

(56) References Cited

U.S. PATENT DOCUMENTS 5,176,752 A * 1/1993 Scheiner ............... C04B 18/148
106/482
5,389,143 A * 2/1995 Abdelrazig ........... C04B 24/122
106/696

(Continued)

FOREIGN PATENT DOCUMENTS

| EP | 1 790 625 A1 | 5/2007 |
| GB | 2 170 495 A | 8/1986 |
| JP | 2007-297535 A | 11/2007 |

OTHER PUBLICATIONS

International Search Report Issued Oct. 21, 2015 in PCT/FR15/051878 Filed Jul. 7, 2015.

*Primary Examiner* — Anthony J Green
(74) *Attorney, Agent, or Firm* — Oblon, McClelland, Maier & Neustadt, L.L.P.

(57) ABSTRACT

The present invention relates to a mortar composition for interior plaster or coating comprising at least one binder, at least aggregates, sands and/or fillers and at least one additive, characterized in that at least one additive is an agent in powder form capable of scavenging aldehydes and is selected from aminoalcohols.

15 Claims, 2 Drawing Sheets

(51) Int. Cl.

| | |
|---|---|
| *C04B 26/10* | (2006.01) |
| *C04B 28/02* | (2006.01) |
| *C04B 28/04* | (2006.01) |
| *C04B 28/06* | (2006.01) |
| *C04B 28/14* | (2006.01) |
| *C04B 28/16* | (2006.01) |
| *C04B 14/00* | (2006.01) |
| *C04B 16/00* | (2006.01) |

(52) U.S. Cl.
CPC .............. *C04B 26/10* (2013.01); *C04B 28/02* (2013.01); *C04B 28/04* (2013.01); *C04B 28/06* (2013.01); *C04B 28/14* (2013.01); *C04B 28/16* (2013.01)

(58) Field of Classification Search
CPC ......... C04B 28/06; C04B 28/14; C04B 28/16; C04B 28/34
See application file for complete search history.

(56) References Cited

U.S. PATENT DOCUMENTS

| | | |
|---|---|---|
| 2009/0218546 A1 | 9/2009 | Honert et al. |
| 2014/0076203 A1* | 3/2014 | Marazzani ............ C04B 24/122 106/708 |
| 2014/0076205 A1* | 3/2014 | Marazzani ............ C04B 24/122 106/808 |

* cited by examiner

MORTAR COMPOSITION FOR AN INTERIOR COATING OR LINING

CROSS REFERENCE TO RELATED APPLICATION

This application is a National Stage entry under 35 USC 371 of PCT/FR2015/051878, filed on Jul. 7, 2015, and claims priority to French Patent Application No. 1457165, filed on Jul. 24, 2014.

The present invention relates to a dry or pasty mortar composition for interior plaster or coating possessing ambient air purification properties.

The air inside buildings is a mixture of physical, chemical and/or biological pollutants which may have various origins. The construction materials, the finishing products used and the furniture are in particular the source of emissions of volatile organic compounds (VOCs) such as for example optionally halogenated hydrocarbons, alcohols, organic acids, esters or aldehydes, such as formaldehyde, acetaldehyde, hexanal, etc. VOCs have a sufficiently high vapor pressure at ambient temperature and they can therefore be almost completely in the vapor state in the ambient air. They may be emitted by these materials or products over longer or shorter durations, which range from several days to several years depending on the nature and the type of material or product from which they are derived. Particle boards, pressed woods or plywoods, textiles used for furniture or decoration, synthetic or prefabricated wall or floor coverings, varnishes, glues, etc. are known to emit formaldehyde. It is recommended for example to extensively air the rooms during or after the use of these products. The regulations regarding protection against the undesirable emissions of products that may present health risks are becoming increasingly strict and make it necessary to reduce the emission of pollutants as much as possible. For this purpose, it is sometimes possible to act at the source by preventing their production. This is not possible in certain cases, and it is then necessary to act after the formation of the pollutants, either via destructive techniques such as oxidation or irradiation processes or biological processes, or via recovery techniques such as adsorption, condensation, membrane processes or absorption. The construction materials that possess air purification functions used to date mainly use these two types of technologies: mention will be made for example of photocatalytic oxidation with titanium oxide particles that may be incorporated into mortar compositions, or the use of adsorbents or chemisorbents, capable of scavenging VOCs and in particular aldehydes. The drawback of the processes involving catalytic oxidation is mainly the need to have an adequate light source in the room so that the process is carried out effectively. As regards the processes using adsorbent agents, it is in particular known to deposit on the support a composition which forms a film that contains an agent capable of reacting with the formaldehyde and consequently of scavenging it. Among these compounds capable of scavenging aldehydes, mention may be made of compounds containing active methylenes, tannins, amides, and hydrazides. However, it is essential when these compounds are used on decorative coatings that they have no negative impact on the esthetic appearance of the coating. The agent capable of scavenging the aldehydes must not leave traces nor cause discoloration of the surface on which it is placed. Moreover, this agent must not release foul odors, or give rise to emissions that would be contrary to the desired effect. It must consequently remain stable under the usage conditions of the material in which it is incorporated or on which it is deposited.

Formaldehyde scavenging agents commonly used belong to the family of acetoacetamides. When such compounds are introduced into cement matrices for finishing plasters, a strong ammonia odor, due to the hydrolysis of the amide under alkaline conditions, is detected after several days in the room. Compounds of this type cannot therefore be used for the desired application. This odor disappears if the acetoamide-based scavenging agent is used under neutral pH conditions, for example in a plaster based on calcined gypsum. On the other hand, even under these conditions, after several days a yellow-brown discoloration is noted on the surface of the plaster, which is not acceptable with regard to the esthetic appearance.

It is therefore necessary to use other types of agents capable of scavenging aldehydes which do not have the aforementioned drawbacks for uses in alkaline and/or decorative mortars. The present invention falls within this context.

The present invention relates to a dry or pasty mortar composition for interior plaster or coating comprising at least one binder, at least aggregates, sands and/or fillers and at least one additive, one of said additives being an agent in powder form capable of scavenging aldehydes, and being selected from aminoalcohols. This additive is also referred to as a depolluting agent. It is directly incorporated into the mortar composition, without modifying the physical and mechanical properties such as the setting time or the mechanical strength of the mortar.

Figure 1:
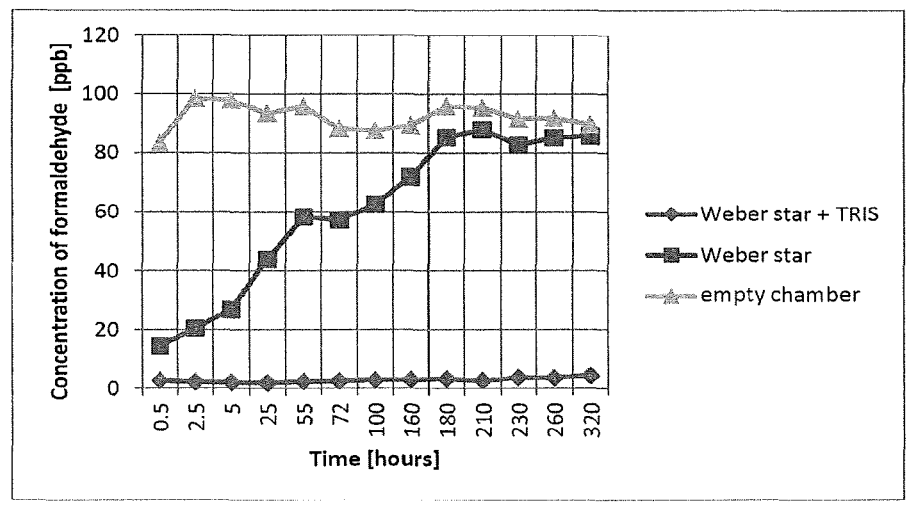
FIG. 1: A graph showing the change in the concentration of formaldehyde in the air leaving the chamber as a function of the time for the various samples tested.

The mortar composition according to the present invention may be in pulverulent form and it is then referred to as a dry composition. It may also be in the form of a dispersion and it will then be referred to as a pasty mortar composition.

The depolluting agent is preferably a primary aminoalcohol of formula $R_1R_2R_3$—C—$NH_2$, wherein $R_1$, $R_2$ and $R_3$ are alkyl groups comprising from 1 to 6 carbon atoms (C1-C6), hydrogen atoms or —OH hydroxyl groups, at least one of the $R_1$, $R_2$ or $R_3$ groups comprising a hydroxyl group.

Preferably, the depolluting agent comprises at least two hydroxyl groups.

Preferably, the depolluting agent is selected from 2-amino-2-methyl-1,3-propanediol, 2-amino-2(hydroxymethyl)propane 1,3 diol (also called tris(hydroxymethyl)aminomethane) and 2-amino-2-ethyl-1,3-propanediol. More preferably, the depolluting agent is the 2-amino-2(hydroxymethyl)propane 1,3 diol that comprises three hydroxyl groups.

The depolluting agent has an absorption capacity such that it makes it possible to absorb the aldehydes present in a room and consequently to purify the indoor air. The aldehydes that are absorbed by the depolluting agent are formaldehyde, acetaldehyde, propionaldehyde, cronotaldehyde, butyraldehyde, benzaldehyde, valeraldehyde or hexaldehyde.

The mortar composition comprises at least one mineral or organic binder, which may be a hydraulic binder, a source of calcium sulfate, a phosphomagnesium binder, lime and/or polymer dispersions or redispersible powders.

The mineral binder is selected from hydraulic binders, sources of calcium sulfate, lime and/or phosphomagnesium binders. Among the hydraulic binders, mention may be made of Portland cements, high-alumina cements, sulfoaluminate cements, belite cements, blast-furnace slags, cements of pozzolanic mixtures optionally comprising fly ash, silica fumes, limestone, calcined schist and/or natural or calcined pozzolans. In the mortar composition according to the present invention it is possible to use this type of binder alone or as a mixture. Among the sources of calcium sulfate, mention may be made of calcined gypsum or hemihydrate, gypsum and/or anhydrite.

When the binder is organic, it is selected from polymer dispersions or redispersible powders. Mention may be made of acrylic and/or vinyl polymers or copolymers, copolymers of styrene and butadiene, copolymers of styrene and acrylic acid, copolymers of vinyl acetate and ethylene, copolymers of vinyl acetate and vinyl versatate, and derivatives thereof.

The amount of mineral or organic binder represents between 1% and 95% by weight of the total amount of the various constituents of the dry or pasty mortar composition.

The dry or pasty mortar composition contains aggregates, sands, and/or calcareous and/or siliceous fillers. These compounds act in particular on the rheology, the hardness or the final appearance of the product. Their content is generally between 1 and 95 wt % relative to the total weight of the composition.

The dry or pasty mortar composition according to the present invention advantageously comprises, in addition to the depolluting agent, additives which are rheological agents such as plasticizers or superplasticizers, water-retaining agents, thickeners, biocidal protective agents, dispersants, mass water-repellent agents, pigments, accelerators and/or retarders, and other agents that make it possible to improve the setting, the hardening and/or the stability of the mortar or concrete after application, to adjust the color, workability, implementation or impermeability. The total content of additives varies between 0.001% and 5% by weight relative to the total mixture of the constituents of the mortar composition.

The present invention also relates to a process for preparing the dry or pasty mortar composition described above. According to one embodiment, the depolluting agent capable of scavenging the aldehydes is directly mixed with the binder, the aggregates, sands and/or fillers and other possible additives during the preparation of the mortar composition. It is also possible to add the depolluting agent directly to an already prepared mortar composition comprising at least one binder, at least aggregates, sands and/or fillers and optional additives. This addition may be carried out before or at the moment of mixing the mortar composition with water in the case of a dry composition. One of the advantages of the depolluting agent used in the mortar compositions according to the invention is in particular that it is in powder form, which enables it to be incorporated in the same way as other constituents of the mortar composition.

The present invention also relates to an interior coating for floors, walls and/or ceilings obtained from a dry mortar composition mixed with water or a pasty mortar composition that is then hardened. Such a coating contains between 5 and 50 g/m$^2$ of depolluting agent capable of scavenging the aldehydes which is selected from aminoalcohols as described above.

The coating according to the present invention makes it possible to absorb and consequently depollute, over several years, a room in which it is deposited. Its operating life is therefore entirely compatible with a customary use of an interior coating, since it is several years. The invention also relates to the use of such a coating for reducing the amount of aldehydes in the indoor air of a building. The coating according to the present invention is sufficiently porous so that the pollutants contained in the ambient air can be captured directly by the scavenger depolluting agent contained in the mortar composition that is used to prepare said coating.

Very advantageously, the products obtained from the dry or pasty mortar composition according to the present invention have no ammonia odor.

The examples below illustrate the invention without limiting the scope thereof.

Example 1: Cement-Based Interior Plaster Comprising Tris(Hydroxymethyl)-Aminomethane that Scavenges Formaldehydes 1% by weight of tris(hydroxymethyl)aminomethane is added to a cement-based interior plaster that is commercially available under the name Weber.star 220.

The performances for eliminating pollutants of formaldehyde type contained in a gas phase with this composition according to the invention are measured and are compared with an interior plaster composition of the same type (Weber.Star 220) without an additive capable of scavenging formaldehydes. An empty test chamber, without a sample of plaster, was also tested, by way of calibration.

The various samples are tested according to the method described in the ISO 16000-23 standard, with the following conditions and in three test chambers in parallel:
the pollutant is injected at the inlet of each of the chambers comprising each sample, at a concentration of around 90 ppbv (parts per billion, by volume),
the relative humidity of the test chamber is 49%,
the temperature of the test chamber is 23° C.,
the flow rate of air comprising the pollutant is 1.6 l/min,
the surface area of each sample is 0.2 m$^2$ (each chamber comprises two pieces of 380 mm*270 mm each),
the volume of the chamber is 28.2 l.

Each test consists in placing each of the plaster samples in a chamber, in continuously sending a stream of air polluted by formaldehydes through the chamber, so that the surface of the sample is continuously swept by a stream of polluted air, and in measuring at the outlet of the chamber the concentration of formaldehyde present in the outgoing air. The circulation of polluted air through the chamber is maintained for 320 hours.

FIG. 1 represents the change in the concentration of formaldehyde in the air leaving the chamber as a function of the time for the various samples tested.

As expected, the air leaving the chamber without a sample of plaster (curve represented by the triangle-shaped symbols) does not change over time: the concentration of formaldehyde remains stable (around 90 ppbv). In the chamber comprising the Weber.star 220 interior plaster without additive capable of scavenging the pollutants (curve represented by the square-shaped symbols), the concentration of formaldehyde increases regularly to reach the level of pollutant contained in the incoming air after around 180 minutes. At the start of the test, the concentration of formaldehyde is relatively low (less than 20 ppbv) which may be explained by a physical absorption of the pollutant in the pores of the plaster matrix.

On the other hand, it is noted that the concentration of formaldehyde remains stable and below 5 ppbv throughout the duration of the test in the chamber that comprises the sample according to the present invention, that is to say the sample of Weber.star 220 comprising 1% by weight of tris(hydroxy-methyl)aminomethane (curve represented by the diamond-shaped symbols). The plaster obtained from the mortar composition comprising the formaldehyde scavenging agent is consequently sufficiently reactive to eliminate all of the pollutant introduced throughout the duration of the test.

Example 2: Determination of the Formaldehyde Sorption Capacity of a Cement-Based Interior Plaster Comprising 1% of Agent Capable of Scavenging Formaldehyde Tests were carried out to determine the sorption capacity of an interior plaster sold under the name Weber.star 220, to which 1% by weight of tris(hydroxymethyl)aminomethane was added, as described in the ISO 16000-23 standard.

The plaster, once hardened, was manually ground in a mortar and was screened. The fractions having a size of between 1 and 4 mm were placed in a glass tube having an internal diameter of 20 mm, in order to fill 123 mm in the tube. The amount of ground material in the glass tube is 34.99 g. A stream of air polluted by formaldehydes is sent into the tube comprising the sample and at the same time into a control tube without sample, with a flow rate of 1.6 l/min. The concentration of formaldehyde in the air entering the tubes is around 2000 ppbv. The tests are carried out at a temperature of 23° C. The concentrations of formaldehyde are measured in the stream of air leaving each of these tubes, continuously.

Figure 2:
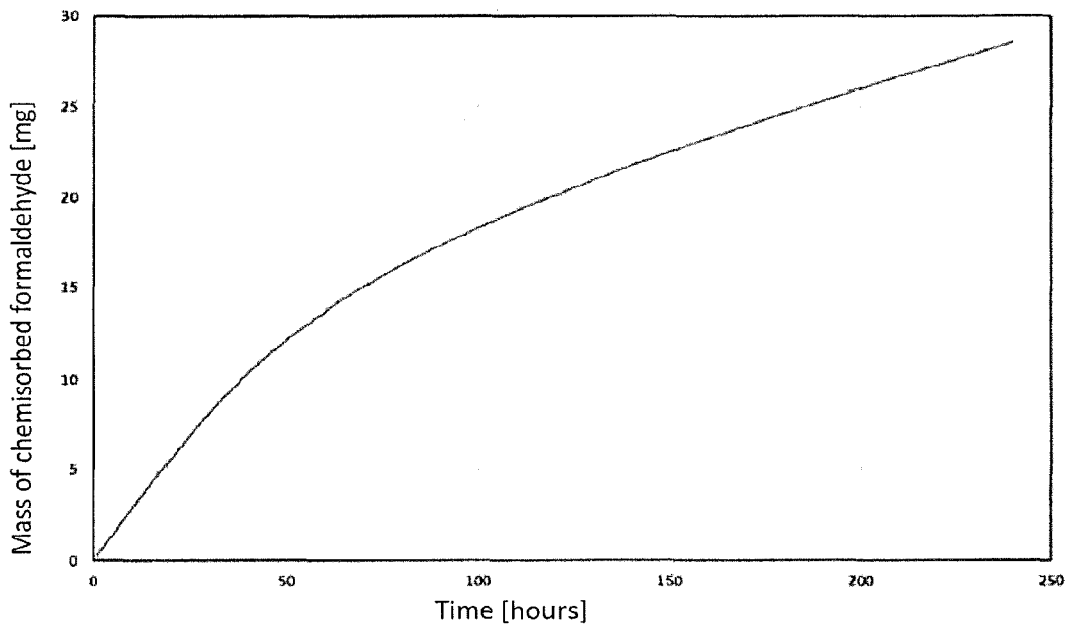
FIG. 2: A graph showing the amount of formaldehyde absorbed as a function of time.

FIG. 2 represents the amount of formaldehyde absorbed as a function of time. The test was stopped after 240 hours (i.e. 10 days), when the maximum sorption capacity of the plaster sample tested was still not reached. At the time of stopping, the amount of plaster introduced (i.e. 34.99 g) had scavenged 28.6 mg of formaldehyde.

Consequently, 1 g of plaster according to the present invention, i.e. comprising 1% by weight of tris(hydroxymethyl)aminomethane can scavenge at least 0.82 mg of formaldehyde.

Example 3: Estimation of the Long-Term Performance of a Plaster Comprising 1% by Weight of Tris(Hydroxymethyl)Aminomethane From tests carried out in example 2 which make it possible to deduce that the sorption capacity is at least 0.82 mg of formaldehyde per gram of plaster, owing to the fact that 3 kg of plaster is used per $m^2$, parameters used in the AgBB control room model (the abbreviation AgBB corresponding to "Ausschuss zur gesundheitlichen Bewertung von Bauprodukten" which is a German committee representing the German public health authorities in charge of VOC emissions in construction materials), and by considering a concentration of formaldehyde at the equilibrium state of 50 µg/$m^3$ (which means that there is permanently 1.5 mg of formaldehyde in the room), it is possible to determine that the plaster in this room makes it possible to scavenge the total amount of formaldehydes emitted over a duration of at least 16 years.

In order to perform this calculation, the following data were used:
 formaldehyde sorption capacity of the plaster: at least 0.82 mg per gram of plaster
 surface area coated with the plaster: 43.4 $m^2$
 consumption of plaster: 3 kg/$m^2$
 amount of plaster in the room: 130.2 kg
 volume of the room: 30 $m^3$
 exchanged air flow rate in the room: 0.5 l/h Example 4: Evaluation of the Discoloration An interior finishing plaster based on calcined gypsum comprising 30% by weight of hemihydrate $CaSO_4$, 69% by weight of calcareous sand and either 1% by weight of tris(hydroxymethyl)aminomethane or 1% by weight of acetoacetamide is mixed with 25% by weight of water and is applied over a thickness of 2 mm to an asbestos-cement board. A control sample without any scavenging agent and with the same interior plaster based on calcined gypsum is also prepared in the same way. The degree of discoloration (yellowing) is evaluated by measuring the colorimetric parameters L*, a*, b* with a Konica Minolta CM-3610d spectrophotometer (illuminant D65 in the 1976 CIE Lab system) after storage indoors under ambient conditions for 1 day, 20 days and 40 days.

Figure 3:
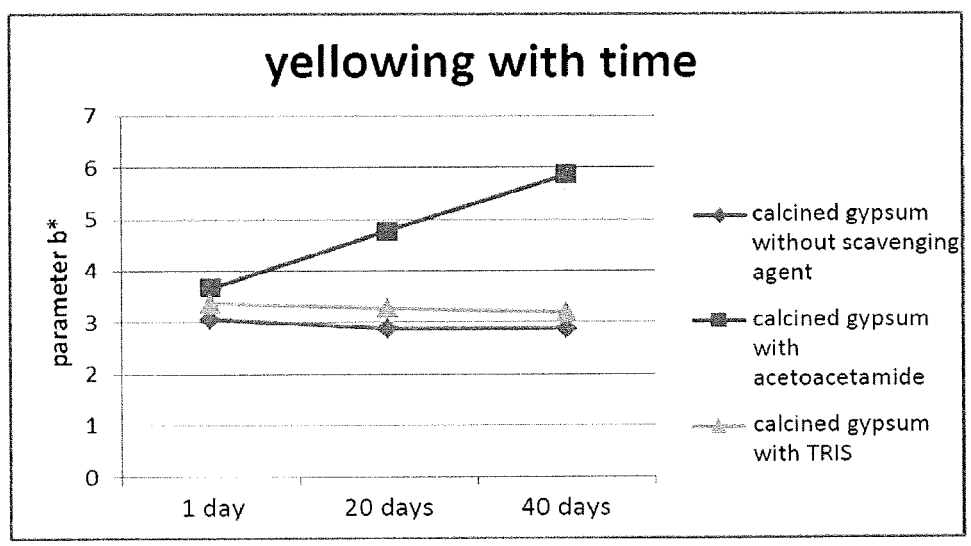
FIG. 3: A graph showing the change in the parameter b* as a function of the time for the various samples tested.

As can be observed in table 1 and in FIG. 3 which represents the change in the parameter b* as a function of the time for the various samples tested, the color remains stable for the control sample that does not contain scavenging agent and for the sample that contains tris(hydroxymethyl) aminomethane. On the other hand, the sample that comprises 1% by weight of acetoacetamide as scavenging agent has a tendency to yellow with time.

TABLE 1

|  | L*, a*, b* After 1 day | L*, a*, b* After 20 days | L*, a*, b* After 40 days |
| --- | --- | --- | --- |
| Control sample without scavenging agent | 90.14 0.3 3.06 | 89.58 0.25 2.88 | 89.24 0.27 2.88 |
| Sample comprising 1 wt % of acetoacetamide | 89.23 0.23 3.68 | 89.06 −0.06 4.77 | 88.37 −0.19 5.87 |
| Sample comprising 1 wt % of tris(hydroxymethyl)aminomethane | 89.12 0.33 3.37 | 89.17 0.29 3.27 | 89.37 0.26 3.2 |

Example 5: Ammonia Emissions

A sample of a cement-based interior plaster that is commercially available under the name Weber.star 220 is mixed either with 1% by weight of tris(hydroxymethyl)aminomethane or with 1% by weight of acetoacetamide and with water.

100 g of each of the fresh samples are placed in sealed desiccators. After 24 hours, the concentration of ammonia in the air inside the desiccator is measured with 5/a ammonia-detecting Draeger tubes, and with a Draeger Accuro pump. The measurements carried out showed that the air from the desiccator in which the sample comprising acetoacetamide as scavenging agent contained 40 ppm of ammonia. No trace of ammonia was detected in the air from the desiccator which contained the sample of plaster with tris(hydroxymethyl)aminomethane.

The invention claimed is:

1. A method, comprising:
   coating a surface of a floor, wall, and/or ceiling in a building interior with a mortar composition comprising at least one binder,
   at least one aggregate, sand, and/or a filler, and
   at least one aminoalcohol; and
   hardening the mortar composition on the surface of the floor, wall, and/or ceiling, to obtain a coated floor, wall, and/or ceiling comprising a coating comprising the mortar composition in hardened form on the surface thereof,
   wherein the coating reduces an amount of aldehydes in indoor air of the building interior without discoloration of the coated floor, wall, and/or ceiling.

2. The method of claim 1, wherein a concentration of formaldehyde in a circulated, polluted air above the coating remains below 5 parts per billion by volume for 320 hours.

3. The method of claim 1, wherein the coating further comprises plaster and wherein the coating can scavenge at least 0.82 mg of formaldehyde per gram of plaster.

4. The method of claim 1, wherein the coated floor, wall, and/or ceiling exhibits an absolute value of a difference between a colorimetric parameter b* after 40 days and a colorimetric parameter b* after 1 day of less than 0.42, wherein the colorimetric parameters b* are measured according to 1976 CIE Lab system with illuminant D65.

5. The method of claim 1, wherein the coated floor, wall, and/or ceiling an absolute value of a difference between a colorimetric parameter b* after 40 days and a colorimetric parameter b* after 1 day of 0.17 or less, wherein the colorimetric parameters b* are measured according to 1976 CIE Lab system with illuminant D65.

6. The method of claim 1, wherein the coating does not release ammonia when stored in a desiccator for 24 hours.

7. The method of claim 1, wherein the aminoalcohol is a primary aminoalcohol of formula (I):

$$R_1R_2R_3\text{—C—NH}_2 \qquad (I)$$

wherein:
R$_1$, R$_2$ and R$_3$ are alkyl groups comprising from 1 to 6 carbon atoms, hydrogen atoms or —OH hydroxyl groups; and
wherein at least one of the R$_1$, R$_2$, or R$_3$ groups comprises a hydroxyl group.

8. The method of claim 7, wherein the aminoalcohol is selected from the group consisting of 2-amino-2-methyl-1, 3-propanediol, 2-amino-2(hydroxymethyl)propane 1,3 diol and 2-amino-2-ethyl-1,3-propanediol.

9. The method of claim 1, wherein the mortar composition comprises from 1% to 95% by weight based on a total weight of the mortar composition of at least one binder selected from the group consisting of:
   a hydraulic binder selected from the group consisting of Portland cements, high-alumina cements, sulfoaluminate cements, belite cements, blast-furnace slags, cements of pozzolanic mixtures optionally comprising fly ash, silica fumes, limestone, calcined schist natural or calcined pozzolans, and any mixture thereof;
   at least one source of calcium sulfate selected from the group consisting of calcined gypsum or hemihydrate, gypsum and anhydrite;
   lime;
   a phosphomagnesium binder; and
   an organic binder which is a polymer dispersion or redispersible powder.

10. The method of claim 9, wherein the binder is an organic binder and the organic binder is an acrylic and/or vinyl polymer or copolymer, a copolymer of styrene and butadiene, a copolymer of styrene and acrylic acid, a copolymer of vinyl acetate and ethylene, a copolymer of vinyl acetate and vinyl versatate, or a derivative thereof.

11. The method of claim 1, wherein the mortar composition further comprises from 0.001% to 5% by weight based on a total weight of the mortar composition of at least one additive selected from the group consisting of:
   a rheological agent;
   a water-retaining agent;
   a thickener;
   a biocidal protective agent;
   a dispersant;
   a water-repellent agent;
   a pigment;
   an accelerator; and
   a retarder.

12. The method of claim 1, wherein the coating comprises from 5 to 50 g/m$^2$ of aminoalcohol.

13. The method of claim 1, wherein the mortar composition does not comprise silica fumes.

14. The method of claim 1, wherein the mortar composition comprises from 1% to 5% by weight of aminoalcohol, based on a total weight of the mortar composition.

15. The method of claim 1, wherein the mortar composition does not comprise a pozzolanic binder.

* * * * *